United States Patent
Nilsson

(10) Patent No.: US 7,952,514 B2
(45) Date of Patent: May 31, 2011

(54) ENERGY STORAGE UNIT FOR A RADAR LEVEL GAUGE SYSTEM

(75) Inventor: Leif Nilsson, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 149 days.

(21) Appl. No.: 12/274,561

(22) Filed: Nov. 20, 2008

(65) Prior Publication Data
US 2010/0123614 A1 May 20, 2010

(51) Int. Cl.
*G01S 13/08* (2006.01)
*G01S 7/28* (2006.01)

(52) U.S. Cl. ........................ 342/124; 342/175
(58) Field of Classification Search ............... 342/124, 342/175
See application file for complete search history.

(56) References Cited

U.S. PATENT DOCUMENTS

| | | | |
|---|---|---|---|
| 6,535,161 B1 * | 3/2003 | McEwan | 342/124 |
| 6,680,690 B1 * | 1/2004 | Nilsson et al. | 342/124 |
| 6,700,530 B1 * | 3/2004 | Nilsson | 342/124 |
| 6,842,139 B1 * | 1/2005 | Nilsson | 342/124 |
| 6,956,382 B2 * | 10/2005 | Nilsson | 324/644 |
| 7,307,582 B2 * | 12/2007 | Griessbaum et al. | 342/124 |
| 7,372,397 B2 * | 5/2008 | Nilsson | 342/124 |
| 7,548,072 B2 * | 6/2009 | Griessbaum et al. | 324/644 |
| 2002/0101748 A1 | 8/2002 | Loechner | 363/84 |
| 2004/0178950 A1 * | 9/2004 | Arvidsson | 342/175 |
| 2005/0248967 A1 | 11/2005 | Coffey et al. | 363/59 |
| 2006/0273949 A1 | 12/2006 | Nilsson | 342/124 |
| 2010/0123614 A1 * | 5/2010 | Nilsson | 342/124 |

FOREIGN PATENT DOCUMENTS
WO  WO 0191273  11/2001

OTHER PUBLICATIONS

Boon, J.D.; Heitsenrether, R.M.; Bushneil, M.;, "Microwave-acoustic water level sensor comparisons: Sensor response to change in oceanographie and meteorological parameters," Oceans 2009, MTS/IEEE Biloxi—Marine Technology for Our Future: Global and Local Challenges, vol., No., pp. 1-10, Oct. 26-29, 2009.*
"International Search Report" for PCT/SE2009/051302 filed Nov. 18, 2009; 3 pages.

* cited by examiner

*Primary Examiner* — John B Sotomayor
(74) *Attorney, Agent, or Firm* — Westman, Champlin & Kelly, P.A.

(57) ABSTRACT

A radar level gauge system comprising power management circuitry for regulating operating power to be used by a microwave unit and a processing circuitry of the radar level gauge system. The power management circuitry comprises a DC-DC converter having an input terminal connected to the interface, an output terminal connected to the microwave unit and the processing circuitry, and a reference terminal connected to an electrical reference point, wherein a first voltage level at the input terminal and a second voltage level at the output terminal relates to a reference voltage level at the electrical reference point. The power management circuitry further comprises an energy storage capacitor connected between the input and output terminals of the DC-DC converter. According to this design, the capacitance of the power management circuitry gets reduced due to that the capacitance is originating from a series capacitance.

15 Claims, 2 Drawing Sheets

ENERGY STORAGE UNIT FOR A RADAR LEVEL GAUGE SYSTEM

TECHNICAL FIELD OF THE INVENTION

The present invention relates to a radar level gauge system using microwaves for measuring a level of a surface of a product in a container. More specifically, the invention relates to energy storage in such a gauge.

TECHNICAL BACKGROUND

Radar level gauges are suitably used for making non-contact measurements of the level of products such as process fluids, granular compounds and other materials. An example of such a radar level gauge system can include a microwave unit for transmitting microwaves towards the surface and receiving microwaves reflected by the surface, processing circuitry arranged to communicate with said microwave unit and to determine said level based on a relation between transmitted and received microwaves, an interface for connecting said processing circuitry externally of said radar level gauge, and a power management circuitry providing said microwave unit and said processing circuitry with operating power.

In order to ensure a satisfactory signal level of the received echo, the emitted microwaves must have a sufficient power level. The processing of received signals also requires significant power, and in some cases the clock frequency of the processor is increased during the processing in order to enable high speed calculations. In combination, this results in an increased demand of power during certain parts of the measuring cycle. The power requirements are especially high for Frequency Modulated Continuous Wave (FMCW) systems. However, the provision of power is relatively difficult to achieve in practice, since energy is normally a scarce resource in the above-discussed type of gauges.

In particular, limited available power is a problem in systems using a two wire feeding system. Radar level gauges for measuring of a level in a tank, and other types of process sensors, are typically connected with a two-wire interface, where only two lines serve to both supply the sensor with limited power and to communicate a measured and processed measuring signal. The interface can be a 4-20 mA industrial loop with superimposed digital communication, or another two-wire fieldbus, such as Fieldbus Foundation (FF) or Profibus. Other possible interfaces include a four-wire interface, where two lines provide power, and two wires communicate measurement signals. In case of a 4-20 mA loop, the available power is thus dependent upon the signal value of the gauge, so that during periods with low signal value (e.g. around 4 mA) only a very limited power is available. Even during periods of high signal value (e.g. around 20 mA) the available power may not be sufficient to power the processing circuitry and the microwave emitter during a measurement cycle.

For this reason, power management in some form may be required, to distribute the available power between different components and over time. Such power management may include storage of energy in some kind of energy storage device, so that this energy can be used to boost the available power during periods of increased power requirements. The energy storage can take place in specifically designated standby periods, following each measurement cycle, or take place throughout the measurement cycle, during periods of low activity.

In the case where measurements are made in a tank containing explosive gas or liquids or in any other situation where the sensor is located in an explosion endangered area, there is also an issue of explosion protection. Normally, either the installation is made explosion proof by some kind of casement, or its outside electrical connection is made intrinsically safe (IS). The latter case requires that input power, voltage and current do not exceed levels stated by safety regulations (IS requirements). This is ensured by a so called electrical barrier, arranged in the interface to the intrinsically safe area.

However, these IS requirements also limit the levels of energy storage allowed in the installation at given voltage and current levels. Such limitations apply to any energy store present in the system, such as capacitance and inductance, and severely limits the applicability of energy storage solutions as outlined above. In many cases this results in a need for the cumbersome and expensive process of encasing the circuitry, e.g. by molding, and in other cases even encasement is not accepted by the safety regulations as a means to ensure an explosion proof installation.

SUMMARY OF THE INVENTION

It is an object of the present invention to address the above problems in a radar level gauge system as described above, and to provide improved energy storage in a radar level gauge system without violating safety regulations (IS requirements).

This object is achieved with a radar level gauge, a power supply circuit and a method according to the appended claims.

The invention is based on the realization that while only very limited energy storage (e.g. capacitance) is allowed at the operational voltage, the restrictions are much less severe at lower voltages.

According to a first aspect of the present invention, there is provided a radar level gauge system using microwaves for measuring a level of a surface of a product in a container, comprising a microwave unit for transmitting microwaves towards the surface and receiving microwaves reflected by the surface, processing circuitry connected to the microwave unit and arranged to determine the level based on a relation between transmitted and received microwaves, an interface for providing communication and power to the radar level gauge system, and power management circuitry for regulating operating power to be used by the microwave unit and the processing circuitry, wherein the power management circuitry comprises a DC-DC converter having an input terminal connected to the interface, an output terminal connected to the microwave unit and the processing circuitry, and a reference terminal connected to an electrical reference point, wherein a first voltage level at the input terminal and a second voltage level at the output terminal relates to a reference voltage level at the electrical reference point, and an energy storage capacitor connected between the input and output terminals of the DC-DC converter.

According to this design, a sufficient amount of energy may be stored in the energy storage capacitor, and the storage capacity of the energy storage capacitor may essentially be unlimited. The possibility to use a large capacitor is due to the fact that the energy storage capacitor from a circuit schematic perspective will be placed in parallel with the load capacitance of microwave unit and the processing circuitry. Accordingly, the capacitance of the power management circuitry gets "reduced" due to that the capacitance is originating from a series capacitance.

Additionally, by placing the storage capacitor directly between the input and output of a DC-DC converter (e.g. between the positive terminals of the DC-DC converter, the DC-DC converter is mainly driven, during discharge, by the accumulated voltage across the energy storage capacitor. Thus, it will be possible to use an energy storage capacitor that has a capacitance of at least 100 µF.

The interface can be adapted to receive power in an intrinsically safe manner, typically by means of an electrical barrier. The interface can be a two-wire interface, arranged both to transmit measurement data to a remote location and to receive power for operation of the system. For example, the interface can be a 4-20 mA industrial loop with superimposed digital communication (HART), a Fieldbus Foundation bus, or a Profibus. Such loops are widely used to power radar level gauges. Alternatively, the interface can be four-wire interface. It should furthermore be noted that the two-wire interface of the radar level gauge system 10 may be arranged both to transmit measurement data to a remote location and to receive power for operation of the radar level gauge system 10. Additionally, the radar level gauge system 10 may further comprise a current control unit, adapted to regulate the current in the two-wire interface in accordance with the measured level.

Also, the radar level gauge system may further comprising at least one voltage limiting zener diode arranged in parallel with the energy storage capacitor which in turn will allow for the possibility to limit the voltage level over the energy storage capacitor.

The IS requirements basically set a limitation for the amount of energy storage that is allowed at a given voltage. In some applications, the operating voltage is as low as 3 V. However, due to diode characteristics, component tolerances and safety margins, the IS requirements must be fulfilled for a voltage as high as 9 V.

According to one embodiment, the microwave unit is adapted to emit pulsed signals, and the processing circuitry is adapted to determine a filling level of the container based on the time between the emission of a pulsed signal and the reception of the reflected signal. This type of measuring is referred to as pulsed measuring.

According to a second embodiment, the microwave unit is adapted to emit waves over a range of frequencies, and the processing circuitry is adapted to determine a filling level of the container based on a mix of the emitted signal and the reflected signal. This type of measuring is referred to as FMCW (Frequency Modulated Continuous Wave).

According to a second aspect of the present invention, the above-mentioned and other objects are achieved by a power management circuitry arranged to provide regulated operating power to a sensor for detecting a process variable, the power management circuitry comprising a DC-DC converter having an input terminal, an output terminal, and a reference terminal connected to an electrical reference point, wherein a first voltage level at the input terminal and a second voltage level at the output terminal relates to a reference voltage level at the electrical reference point, and an energy storage capacitor connected between the input and output terminals of the DC-DC converter.

As discussed above in connection with the first aspect of the present invention, the inventive power management circuitry provides for the possibility to store a sufficient amount of energy n the temporary energy store as a large, or essentially unlimited, capacitor may be used.

Further embodiments of, and effects obtained through this second aspect of the present invention are largely analogous to those described above for the first aspect of the invention.

According to a third aspect of the present invention, the above-mentioned and other objects are achieved by a method for providing regulated operating power to a radar level gauge system using microwaves for measuring a level of a surface of a product in a container, comprising providing a DC-DC converter having an input terminal, an output terminal, and a reference terminal connected to an electrical reference point, wherein a first voltage level at the input terminal and a second voltage level at the output terminal relates to a reference voltage level at the electrical reference point, and connecting an energy storage capacitor connected between the input and output terminals of the DC-DC converter, storing energy in the energy storage capacitor, regulating the first voltage level for forming the second voltage level using the DC-DC converter and the energy storage capacitor, and providing the second voltage level corresponding to the regulated operating power to a microwave unit of the radar level gauge system arranged to transmit and receive the microwaves.

Various embodiments of, and effects obtained through this third aspect of the present invention are largely analogous to those described above for the first and second aspects of the invention.

BRIEF DESCRIPTION OF THE DRAWINGS

This and other aspects of the present invention will now be described in more detail, with reference to the appended drawings showing a currently preferred embodiment of the invention.

DETAILED DESCRIPTION OF A PREFERRED EMBODIMENT OF THE INVENTION

Figure 1:
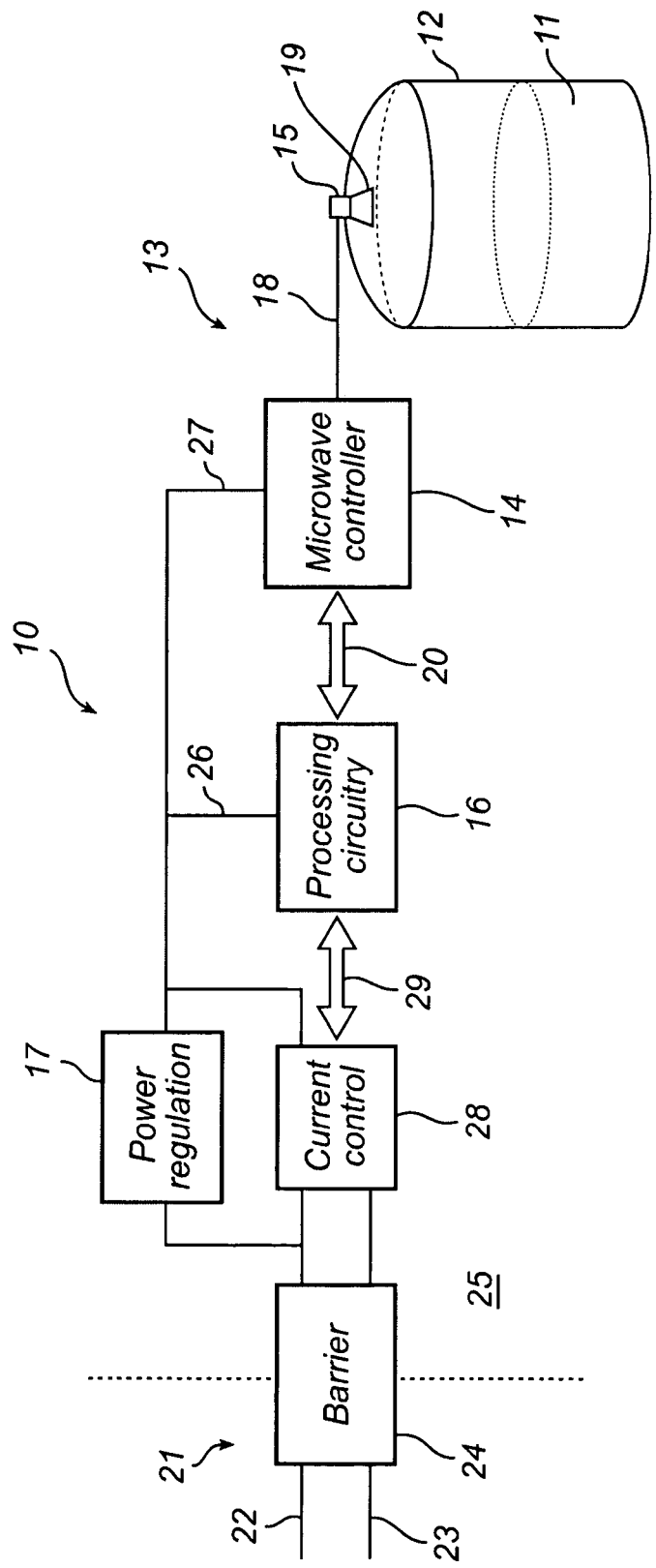
FIG. 1 is a functional block diagram of a radar level gauge system in which the present invention can be implemented.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the person skilled in the art. Like reference characters refer to like elements throughout.

FIG. 1 shows a schematic block diagram of a radar level gauge system 10, in which the present invention advantageously can be implemented. The radar level gauge system is arranged to determine the position of the surface of a material 11 in a tank 12 (i.e. the level of the material 11). The radar level gauge system 10 includes a microwave unit 13, adapted to emit waves into the tank, and to receive reflected microwaves, processing circuitry 16 for communicating with the microwave unit 13 and for determining a measurement result based on a relation between transmitted and received microwaves, and a power management circuit 17 for providing required power to the processing circuitry and the microwave unit 13.

The microwave unit 13 can comprise a microwave controller 14, a microwave emitter/receiver 15, and a signal transfer medium 18 connecting the emitter/receiver 13 to the microwave controller 14. The microwave controller 14 is connected to the processing circuitry 16 by a data bus 20, and is adapted to generate a microwave signal in accordance with control data from the processing circuitry 16. The microwave controller 14 can comprise a transmitter, a receiver, a circulator and any control circuitry required to manage these components. Further, the microwave controller 14 can comprise an A/D-converter for digitizing a tank signal, i.e. a signal received from the tank. The emitter/receiver 15 may, as shown in FIG. 1, include a free radiating antenna 19 in the top of the tank, or alternatively the emitter/receiver 15 can include a probe extending into the tank. The signal transfer medium 18 can be a wire or cable, but may also include more sophisticated wave guides. In case of an explosive or otherwise dangerous content in the tank 12, the signal transfer medium 18 may include an air tight seal passing through the tank wall. It is also possible that the microwave controller 14 is connected directly to the emitter/receiver 15 with a suitable terminal, or that the emitter/receiver 15 is arranged on the same circuit board as the microwave controller 14, in which case the signal transfer medium simply may be a track on the circuit board.

The radar level gauge system 10 is connected to an interface 21, for providing the radar level gauge system 10 with drive power, and possibly also for communicating a measurement result externally to the radar level gauge system 10. In the illustrated example, the interface 21 is a two-wire interface, comprising two lines 22, 23, and an electrical barrier 24. The barrier 24 ensures that the area 25, in which the gauge system 10 is installed, is intrinsically safe (IS), i.e. that power, current and voltage are kept below given limits, reducing the risk of hazard. An example of such a two-wire interface, at the same time providing drive power and communicating a measurement signal, is a 4-20 mA industrial loop.

The power management circuitry 17 is connected to one of the lines 22 and is adapted to convert the voltage in the two-wire interface (typically in the order of 20 V), into an operating voltage suitable for the processing circuitry 16 and the microwave controller 14, typically in the order of 3 V. The power management circuitry 17 is connected to the processing circuitry 16 via a line 26 and to the microwave controller 14 via a line 27.

Both lines 22, 23 are further connected to a current control unit 28, which is controlled by the processing circuitry 16 via a digital bus 29. The bus 29 also carries communication according to the HART protocol, to be superposed in the current in the loop 22, 23. The control unit 28 can be supplied with drive voltage from the power management circuitry 17.

In use, the processing circuitry 16 controls the microwave controller 14 to generate a measurement signal to be emitted into the tank 12 by the emitter/receiver 15. This signal can be a pulsed signal (pulsed level gauging) or a continuous signal with a frequency varying over a certain range (Frequency Modulated Continuous Wave, FMCW). The microwave emitter 15 acts as an adapter, enabling the signal generated in the microwave controller 14 to propagate into the tank 12 as microwaves, which can be reflected by the surface of the material 11. A tank signal, i.e. the emitted signal and its echo, or a mix of emitted and reflected signals, is received by the emitter/receiver 15, and communicated to the microwave controller 14, where it is received and A/D converted. The digitized signal is then provided to the processing circuitry 16 via bus 20, and the processing circuitry 16 determines a measurement result based on a relation between the emitted and received waves. The measurement result is then communicated to the current control unit 28 via bus 29, and the current flowing through the current control unit 28 is regulated so that the total current in the current loop corresponds to the measurement result.

Figure 2:
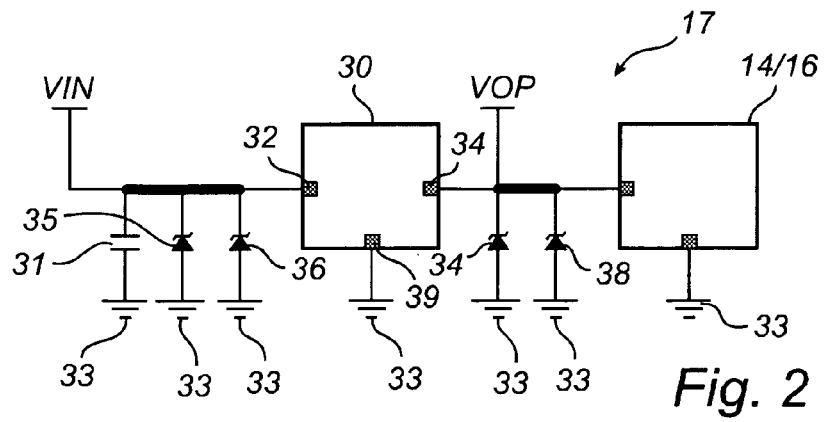
FIG. 2 is a schematic circuit diagram of a prior art power management circuitry.

FIG. 2 shows a prior art implementation of a power management circuitry 17. In the simplest case, the power management circuitry 17 comprises a DC-DC converter 30 and an energy storage capacitor 31 connected between the input terminal 32 of the DC-DC converter and a common electrical reference point 33 (generally electrical ground/earth). Accordingly, a load (such as for example the power management circuitry 17 and the microwave controller 14 connected via lines 26 and 27, respectively) connected to an output terminal 34 will be provided with a regulated operational power supply, VOP (effectively representing a second voltage level in relation to the reference point 33), which has been converted from a power supply, VIN (effectively representing a first voltage level in relation to the reference point 33) received at the interface 21. For possible voltage/current limitation, the power management circuitry 17 may further comprise zener diodes 35, 36 arranged between the input terminal 32 and the electrical reference point 33, and zener diodes 37, 38 arranged between the output terminal 34 and the electrical reference point 33. In the present embodiment, the ground symbol indicates a common ground level for all included components. Also, in the current embodiment the DC-DC converter further comprises a reference terminal 39 connected to the electrical reference point 33 (i.e. ground).

However, according to this prior art design, only a fraction of the energy stored in the energy storage capacitor 31 will be utilized, generally only providing an energy efficiency around 85%. Accordingly, a large energy storage capacitor 31 must be used for providing the possibility to allow an extra energy boost in the case where the load requires extra energy to function. Such a case may for example be at a time when the processing circuitry 16 demands more power than is available from the interface 21, wherein the energy storage capacitor 31 will be discharged, thereby providing additional power needed e.g. for powering the microwave unit 13 during a pulse. This will be especially important when the available current in the current loop is low (i.e. during periods of a low measurement value). From an IS perspective this is however problematic as generally only small amount of capacitance are allowed to be used in an IS classified device such as the radar level gauge system 10. Also, using a large energy storage capacitor 31 sets further restrictions on the power management circuitry 17 as a large capacitance will require a long charging time. Furthermore, the energy storage capacitance 31 will from a circuitry perspective be arrange in parallel with an inherent capacitance of the load, effectively summarizing the capacitance of the energy storage capacitor 31 and the capacitance of the load. More specifically:

$$C_{total}=C_{load}+C_{storage}$$

Figure 3:
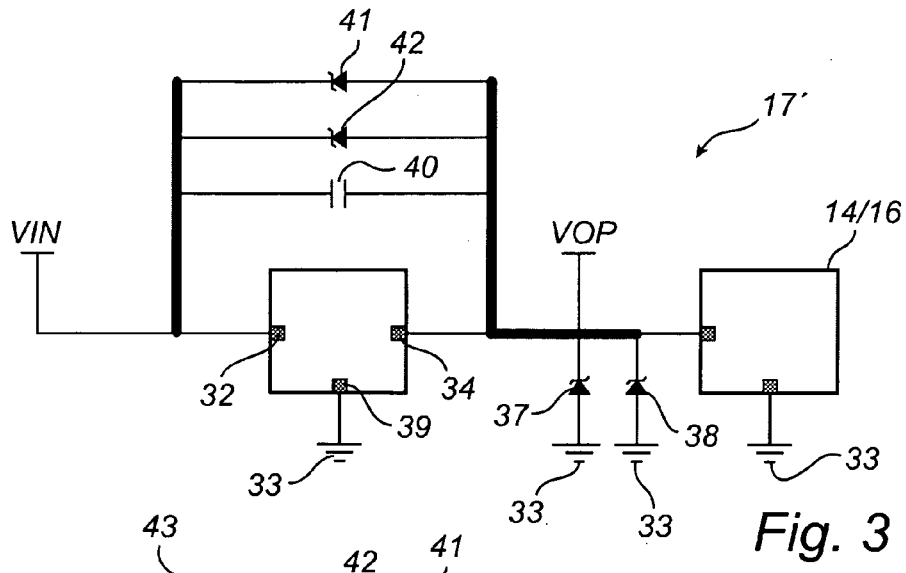
FIG. 3 is a schematic circuit diagram of a first embodiment of a power management circuitry according to the invention.

Turning now to FIG. 3, illustrating a first embodiment of a power management circuitry 17' according to the invention. In FIG. 3. the energy storage capacitor of FIG. 2. has been replaced with a different energy storage capacitor 40 arranged between the input terminal 32 and the output terminal 34 of the DC-DC converter 30. Accordingly, instead of placing the storage capacitor at the input of a DC-DC-converter 30 (as according to prior art), the storage capacitor is placed between the input and output of a DC-DC converter 30 (i.e. between the positive terminals of the DC-DC converter 30). Thus, during discharge the DC-DC converter 30 is mainly driven by the accumulated voltage across the energy storage capacitor 40. A major advantage with the inventive design is that it minimizes the capacitance required on high voltage levels, which is a must from IS perspective. Furthermore, by arranging the energy storage capacitor 40 arranged between the input terminal 32 and the output terminal 34 of the DC-DC converter 30, the capacitance value for the energy storage capacitor 40 will from a circuitry perspective be arrange in series with the inherent capacitance of the load, effectively summarizing the capacitance of the energy storage capacitor 31 and the capacitance of the load. More specifically:

$$C_{total} = \frac{1}{\frac{1}{C_{load}} + \frac{1}{C_{storage}}}$$

Accordingly, the total capacitance for the radar level gauge system 10 may be decreased, thus putting less stress on the IS requirement radar level gauge system 10 and for example the capacitance values of the load.

Figure 4:
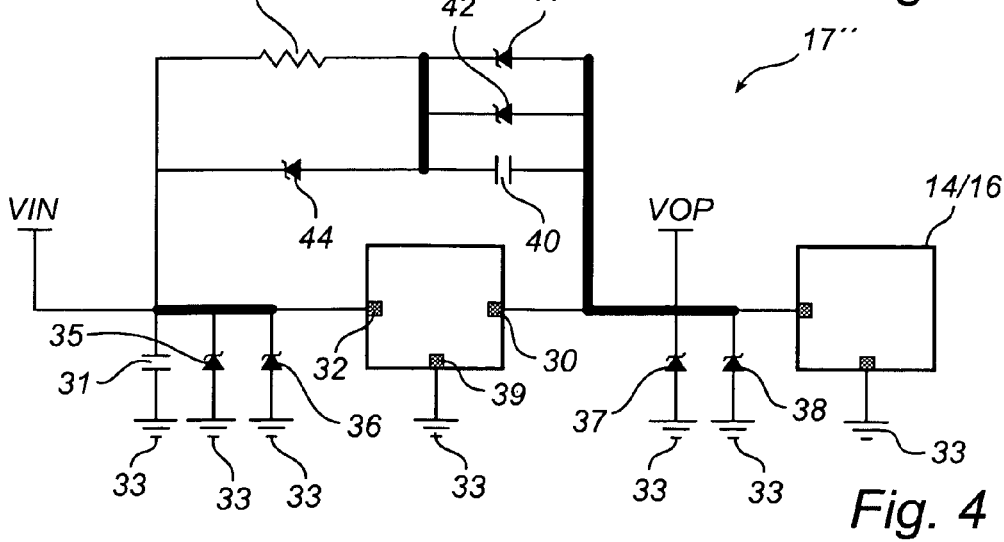
FIG. 4 is a schematic circuit diagram of a second embodiment of a power management circuitry according to the invention.

Similarly, in FIG. 4 there is provided a FIG. 4. another schematic circuit diagram illustrating a second embodiment of a power management circuitry 17" according to the invention. In this second embodiment of the power management circuitry 17", a combination have been done with the features of the prior art power management circuitry 17. That is, in FIG. 4 both the energy storage capacitor 31 and energy storage capacitor 40 are included, possibly further increasing the storage capacity of the power management circuitry 17". A further difference between the power management circuitry 17" and the power management circuitry 17' according to the first embodiment is that only a predetermined portion a voltage difference between the first (VIN) and the second (VOP) voltage levels is provided to the energy storage capacitor 40. For dividing the voltage difference between VIN and VOP, a resistor 43 is used, preferably arranged in parallel with a further zener diode 44 provided for voltage limitation purpose. The person skilled in the art would however appreciate that it may be possible to use different types of voltage dividing circuitry for achieving the same or at least similar purpose. An advantage with this second embodiment power management circuitry 17" is that it may in a better way accommodate high input voltage levels, VIN, as well as providing additional boost of power for high consuming loads.

In summary, the invention relates, among other things, to a radar level gauge system comprising power management circuitry for regulating operating power to be used by a microwave unit and a processing circuitry of the radar level gauge system. The power management circuitry comprises a DC-DC converter having an input terminal connected to the interface, an output terminal connected to the microwave unit and the processing circuitry, and a reference terminal connected to an electrical reference point, wherein a first voltage level at the input terminal and a second voltage level at the output terminal relates to a reference voltage level at the electrical reference point. The power management circuitry further comprises an energy storage capacitor connected between the input and output terminals of the DC-DC converter. According to this design, the capacitance of the power management circuitry gets reduced due to that the capacitance is originating from a series capacitance.

Even though the invention has been described with reference to specific exemplifying embodiments thereof, many different alterations, modifications and the like will become apparent for those skilled in the art. For example, the power management circuitry according to the invention is not necessarily provided in only one place in the radar level gauge, but may be distributed in the system. For example, the power management circuitry described with relation to FIGS. 2, 3 and 4 may be implemented directly in the microwave controller 14. Furthermore, even though the above description has illustrated a DC-DC converter 30 having only a common reference terminal 39, it may in many DC-DC converter applications included in the inventive concept be useful to use input to output isolation may be required to meet safety standards and/or provide impedance matching, as well multiple output voltage levels and output isolation depending on the application. The above discussed power management circuitries 17' and 17" may thus be adapted to provide isolation between input and output. Additionally, it should be noted that the IS barrier 21 may be provided on either sides of the power management circuitries 17' and 17". Accordingly, a connection between the input terminal 32 and the interface 21, as well as a connection between the output terminal 34 and the load (e.g. processing circuitry 16 and microwave unit 13) may each or both include an IS barrier.

Variations to the disclosed embodiments can be understood and effected by the person skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A radar level gauge system using microwaves for measuring a level of a surface of a product in a container, comprising:
   a microwave unit for transmitting microwaves towards the surface and receiving microwaves reflected by the surface,
   processing circuitry connected to the microwave unit and arranged to determine the level based on a relation between transmitted and received microwaves,
   an interface for providing communication and power to the radar level gauge system, and
   power management circuitry for regulating operating power to be used by the microwave unit and the processing circuitry, wherein the power management circuitry comprises:
   a DC-DC converter having an input terminal connected to the interface, an output terminal connected to the microwave unit and the processing circuitry, and a reference terminal connected to an electrical reference point, wherein a first voltage level at the input terminal and a second voltage level at the output terminal relates to a reference voltage level at the electrical reference point, and
   an energy storage capacitor connected between the input and output terminals of the DC-DC converter.

2. The radar level gauge system according to claim 1, wherein the energy storage capacitor has a capacitance of at least 100 μF.

3. The radar level gauge system according to claim 1, further comprising at least one voltage limiting zener diode arranged in parallel with the energy storage capacitor.

4. The radar level gauge system according to claim 1, wherein only a predetermined portion of a voltage difference between the first and the second voltage levels is provided to the energy storage capacitor.

5. The radar level gauge system according to claim 4, further comprising at least one voltage limiting zener diode arranged in parallel with the energy storage capacitor.

6. The radar level gauge system according to claim 1, wherein the interface is arranged to receive power in an intrinsically safe manner.

7. The radar level gauge system according to claim 1, wherein the microwave unit is adapted to emit waves over a range of frequencies, and wherein the processing circuitry is adapted to determine a filling level of the container based on a mix of the emitted signal and the reflected signal.

8. A power management circuitry arranged to provide regulated operating power to a sensor for detecting a process variable, the power management circuitry comprising:
- a DC-DC converter having an input terminal, an output terminal, and a reference terminal connected to an electrical reference point, wherein a first voltage level at the input terminal and a second voltage level at the output terminal relates to a reference voltage level at the electrical reference point, and
- an energy storage capacitor connected between the input and output terminals of the DC-DC converter.

9. The power management circuitry according to claim 8, wherein the energy storage capacitor has a capacitance of at least 100 μF.

10. The power management circuitry according to claim 8, further comprising at least one voltage limiting zener diode arranged in parallel with the energy storage capacitor.

11. The power management circuitry according to claim 8, wherein only a predetermined portion of a voltage difference between the first and the second voltage levels is provided to the energy storage capacitor.

12. The power management circuitry according to claim 8, further comprising at least one voltage limiting zener diode arranged in parallel with the energy storage capacitor.

13. A method for providing regulated operating power to a radar level gauge system using microwaves for measuring a level of a surface of a product in a container, comprising:
- providing a DC-DC converter having an input terminal, an output terminal, and a reference terminal connected to an electrical reference point, wherein a first voltage level at the input terminal and a second voltage level at the output terminal relates to a reference voltage level at the electrical reference point, and
- connecting an energy storage capacitor connected between the input and output terminals of the DC-DC converter,
- storing energy in the energy storage capacitor,
- regulating the first voltage level for forming the second voltage level using the DC-DC converter and the energy storage capacitor, and
- providing the second voltage level corresponding to the regulated operating power to a microwave unit of the radar level gauge system arranged to transmit and receive the microwaves.

14. The method according to claim 13, wherein the radar level gauge system is adapted to emit pulsed signals and further comprises processing circuitry adapted to determine the filling level of the container based on a time between the emission of the pulsed signal and the reception of a reflected signal.

15. The method according to claim 13, wherein the regulated operating power is chosen so that the radar level gauge system fulfills any intrinsically safe requirements.

* * * * *